United States Patent
Li et al.

(10) Patent No.: US 12,009,858 B2
(45) Date of Patent: Jun. 11, 2024

(54) MULTI-SENSOR DATA FUSION-BASED SELF-POWERED ONLINE MONITORING SYSTEM FOR TRANSMISSION LINE

(71) Applicants: State Grid Chongqing Electric Power Co. Electric Power Research Institute, Chongqing (CN); State Grid Corporation of China, Beijing (CN)

(72) Inventors: Yongfu Li, Chongqing (CN); Xiping Jiang, Chongqing (CN); Xingzhe Hou, Chongqing (CN); Qian Wang, Chongqing (CN); Yingkai Long, Chongqing (CN); Qiang Yao, Chongqing (CN); Siquan Li, Chongqing (CN); Xiaoxiao Luo, Chongqing (CN); Yuxiang Liao, Chongqing (CN); Haibing Zhang, Chongqing (CN); Jiankang Bao, Chongqing (CN); Haitao Wu, Chongqing (CN)

(73) Assignees: State Grid Chongqing Electric Power Co. Electric Power Research Institute, Chongqing (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 17/610,695

(22) PCT Filed: Aug. 24, 2021

(86) PCT No.: PCT/CN2021/114404
§ 371 (c)(1),
(2) Date: Nov. 11, 2021

(87) PCT Pub. No.: WO2022/252408
PCT Pub. Date: Dec. 8, 2022

(65) Prior Publication Data
US 2024/0039631 A1    Feb. 1, 2024

(30) Foreign Application Priority Data
Jun. 1, 2021    (CN) .................. 202110608970.X

(51) Int. Cl.
*H04B 10/11* (2013.01)
*H02N 99/00* (2006.01)
(Continued)

(52) U.S. Cl.
CPC ............. *H04B 10/11* (2013.01); *H02N 99/00* (2013.01); *H04B 10/50* (2013.01); *H04B 10/502* (2013.01); *H04B 10/806* (2013.01); *H04B 10/808* (2013.01)

(58) Field of Classification Search
CPC ...... H04B 10/11; H04B 10/50; H04B 10/502; H04B 10/806; H04B 10/808;
(Continued)

(56) References Cited

U.S. PATENT DOCUMENTS 5,357,449 A * 10/1994 Oh ........................... G06N 7/02
                                                            706/900
6,898,464 B2 * 5/2005 Edell ..................... A61B 5/0017
                                                            128/903
(Continued)

FOREIGN PATENT DOCUMENTS

CN    107453643 A    12/2017
CN    112290450 A    1/2021

OTHER PUBLICATIONS

Wu et al, Intelligent Control of Bulk Tobacco Curing Schedule Using LS-SVM- and ANFIS-Based Multi-Sensor Data Fusion Approaches, Apr. 2019, Sensors 2019, All Document. (Year: 2019).*
(Continued)

*Primary Examiner* — Dibson J Sanchez

(57) ABSTRACT

A multi-sensor data fusion-based self-powered online monitoring system for a transmission line includes a plurality of
(Continued)

detection nodes, an optical communication receiving and demodulation module, and a data processing module. The detection nodes each include a vibration energy harvesting module, a sensing module, and an optical communication modulation and transmitting module. The detection node uses a triboelectric nanogenerator (TENG) to convert and harvest energy, uses the sensing module to acquire a plurality of types of sensing data, and uses the optical communication modulation and transmitting module to modulate and transmit the sensing data. The optical communication receiving and demodulation module correspondingly receives and demodulates the sensing data, and transmits the sensing data to the data processing module for processing. The processing includes using a weighted least square method to fuse homogeneous sensing data and using a fuzzy comprehensive evaluation method to analyze heterogeneous sensing data.

11 Claims, 12 Drawing Sheets

(51) Int. Cl.
*H04B 10/50* (2013.01)
*H04B 10/80* (2013.01)

(58) Field of Classification Search
CPC ........ H04B 10/116; H02N 99/00; H02N 1/04; G01D 21/02; H02M 7/217
USPC .................. 398/115–131, 140–172, 182–201
See application file for complete search history.

(56) References Cited

U.S. PATENT DOCUMENTS

| | | | | |
|---|---|---|---|---|
| 7,440,699 | B1* | 10/2008 | Stewart, II | H04B 10/25756 398/171 |
| 7,696,901 | B2* | 4/2010 | Wilson | E21B 47/135 398/171 |
| 9,158,133 | B1* | 10/2015 | Pletcher | A61B 5/14532 |
| 2007/0198222 | A1* | 8/2007 | Schuster | G01D 1/00 702/182 |
| 2009/0054742 | A1* | 2/2009 | Kaminska | G16H 40/63 600/372 |
| 2009/0276184 | A1* | 11/2009 | Mylaraswamy | G01D 18/00 702/185 |
| 2012/0197094 | A1* | 8/2012 | Zhang | A61B 6/04 600/300 |
| 2015/0273145 | A1* | 10/2015 | Nessel | H04B 10/1141 398/106 |
| 2017/0272157 | A1* | 9/2017 | Crowne | H04B 10/807 |
| 2017/0338889 | A1* | 11/2017 | Dinh | H04B 10/25 |
| 2018/0316280 | A1* | 11/2018 | Niu | H02M 1/007 |
| 2020/0076502 | A1* | 3/2020 | Leon-Salas | H04B 10/11 |
| 2021/0000388 | A1* | 1/2021 | Uddin | A61B 5/01 |
| 2021/0091860 | A1* | 3/2021 | Jalkanen | A61B 5/6801 |

OTHER PUBLICATIONS

Zhang et al, Triboelectric Nanogenerator for Harvesting Vibration Energy in Full Space, Oct. 2013, Advanced Functional Materials, All Document. (Year: 2014).*

* cited by examiner

MULTI-SENSOR DATA FUSION-BASED SELF-POWERED ONLINE MONITORING SYSTEM FOR TRANSMISSION LINE

TECHNICAL FIELD

The present disclosure relates to the field of wireless optical communication, and in particular, to a multi-sensor data fusion-based self-powered online monitoring system for a transmission line.

BACKGROUND

The operating status of grid transmission lines is complex and changeable due to ambient impact. Phenomenon such as icing, waving, and lightning strikes cause regular changes in basic parameters (such as a temperature, sag, and vibration). Operational safety of the transmission lines requires a sensing device to sense and monitor these parameters to provide early safety warnings. However, a traditional online monitoring program for transmission lines has single monitoring data. Existing transmission line data monitoring can separately monitor only one or two ambient parameters, and results are one-sided. A monitoring scope is often limited to a small area around a single sensor, and parameters of other areas of the transmission line are ignored. A large error exists in each set of monitoring data for the traditional transmission line monitoring. It is also difficult to analyze integrated data. As people's requirements for efficiency and quality of transmission line detection and management are increasing, traditional monitoring methods can no longer meet current requirements for a more real-time and efficient line monitoring system. Therefore, a multi-sensor data fusion technology provides a reliable idea for the development and implementation of a more real-time, intelligent, and efficient transmission line monitoring system.

In addition, electric energy of current transmission line sensors is mainly supplied by traditional chemical batteries or obtained through high-voltage transmission lines. Chemical batteries such as lithium batteries have shortcomings such as a short service life, difficulty in replacing scrapped batteries, and high costs. Recently, self-powered sensing by harvesting ambient energy has gradually become a main development trend of an energy supply technology of the transmission line monitoring system. For self-powered methods, the energy supply of the system is usually implemented by harvesting ambient energy such as solar energy and converting it into electric energy. However, energy conversion efficiency of solar energy which is one type of ambient energy, is closely related to the intensity of sunlight. Especially in areas in which a total amount of sunlight is small in a whole day, the power supply effect of solar energy for detection nodes of the transmission line is greatly reduced. People often ignore energy carried by breeze vibration, which is also one type of ambient energy and is one of serious hazards of transmission lines. Because breeze vibration is easy to generate, its energy supply continuity is considerable. If a triboelectric nanogenerator (TENG) is used to harvest breeze vibration energy and convert it into electric energy to apply to self-power of sensors, this technology has very broad application prospects.

There is a large amount of monitoring, and the data cannot directly and accurately reflect ambient site conditions. A data fusion technology is a method that uses specific algorithms to reduce the amount of data under the premise of no loss of information, to reduce storage space and improve efficiency of data storage, transmission, and processing. This method is a multi-level and multi-faceted process of automatic detection, relation, correlation, estimation, and combination of source information and data, and the data may be provided by one or more information sources. In the online monitoring system for a transmission line, data fusion is implemented by performing automatic comprehensive analysis of massive multi-source data obtained by a plurality of sensors in chronological order according to specific rules, to complete required decision-making and estimation tasks. Data fusion can greatly improve reliability and accuracy of data, and provide effective data support in the decision-making of the transmission line monitoring system. This has great academic and practical significance for the reliable and effective decision-making and management of the transmission line monitoring system.

SUMMARY

In view of the foregoing problems, the present disclosure provides a multi-sensor data fusion-based self-powered online monitoring system for a transmission line to implement multi-dimensional, self-powered, low-power-consumption, and interference-free monitoring of an environment of a transmission line.

The present disclosure adopts the following technical solution:

A multi-sensor data fusion-based self-powered online monitoring system for a transmission line includes at least one detection node, an optical communication receiving and demodulation module, and a data processing module. The detection nodes each include a vibration energy harvesting module, a sensing module, and an optical communication modulation and transmitting module.

The vibration energy harvesting module is configured to harvest vibration energy and convert it into electric energy for storage, to supply power to the detection node.

The sensing module is configured to acquire a plurality of types of sensing data at a position of the detection node.

The optical communication modulation and transmitting module is configured to modulate the plurality of types of sensing data acquired by the sensing module into an optical signal and radiate the optical signal into the air.

The optical communication receiving and demodulation module is configured to acquire the optical signal radiated into the air, perform optoelectronic conversion and demodulation on the acquired optical signal, and send demodulated data to the data processing module.

The data processing module is configured to use a weighted least square method to fuse each type of sensing data to obtain a first fusion parameter corresponding to each type of sensing data; and use a fuzzy comprehensive evaluation method to analyze the first fusion parameter to obtain a monitoring result.

Further, the vibration energy harvesting module may adopt a vertical contact-separation mode TENG to harvest the vibration energy.

Further, the vibration energy harvesting module may include the TENG and an electric energy management unit. The electric energy management unit includes a rectifier bridge and a filter circuit. An output terminal of the TENG is connected to the rectifier bridge, the rectifier bridge is connected to the filter circuit, and charges are input to the filter circuit for rectification.

Further, the filter circuit may include a charge storage circuit, a threshold switch circuit, and a semioscillation circuit that are connected in sequence. The charge storage circuit is connected to the rectifier bridge.

Further, the TENG may include at least one second triboelectric generation module. The second triboelectric generation module includes a first electrode portion and a second electrode portion that match each other. The first electrode portion includes a dielectric film layer and an electrode layer. The second electrode portion is a spring resonance structure. The electrode layer of the first electrode portion and the second electrode portion serve as output terminals of the second triboelectric generation module.

Further, a side of the first electrode portion close to the second electrode portion may be arc-shaped.

Further, the first electrode portion may include a support frame layer. A side of the support frame layer close to the second electrode portion is arc-shaped. The electrode layer and the dielectric film layer are sequentially disposed on the side of the support frame layer close to the second electrode portion.

Further, the TENG may include N pairs of second triboelectric generation modules, where N is a positive integer. Each pair of second triboelectric generation modules share one second electrode portion. The triboelectric generation modules are stacked.

Further, the TENG may include a first support frame layer, first electrode layer, first dielectric film layer, first spring steel sheet, second dielectric film layer, second electrode layer, second support frame layer, third electrode layer, third dielectric film layer, second spring steel sheet, fourth dielectric film layer, fourth electrode layer, and third support frame layer that are designed layer by layer. The first support frame layer, first electrode layer, first dielectric film layer, and first spring steel sheet form one second triboelectric generation module. The first spring steel sheet, second dielectric film layer, second electrode layer, and second support frame layer form one second triboelectric generation module. The second support frame layer, third electrode layer, third dielectric film layer, and second spring steel sheet form one second triboelectric generation module. The second spring steel sheet, fourth dielectric film layer, fourth electrode layer, and third support frame layer form one second triboelectric generation module. The second electrode layer and third electrode layer are connected to each other.

Further, an arc equation of the side of the first electrode portion close to the second electrode portion may an arc when the second electrode portion vibrates and is curved.

In summary, with the foregoing technical solution, the present disclosure achieves the following beneficial effects:
1. In real life, there is often specific uncertainty in the definition of an evaluation range of ambient parameters. A classical data fusion algorithm has specific shortcomings in dealing with the problem of data uncertainty. The present disclosure first uses a weighted least square fusion model to fuse and analyze homogeneous sensing data. This improves the accuracy of the data acquired by sensors, and provides more accurate and more reliable data input for a second-layer data fusion model. In addition, a fuzzy mathematics theory and a classical data fusion comprehensive evaluation method are combined, and heterogeneous sensing data is fused and analyzed by the fuzzy comprehensive evaluation method. A combined evaluation result of qualitative and quantitative analysis is provided. This improves effectiveness and reliability of the data fusion output result.
2. In the TENG of the present disclosure, a plurality of triboelectric nanogeneration modules are stacked and share (the electrode layer of) the first electrode portion or the second electrode portion. This greatly the size of the generator under same electric energy generation requirements. In addition, the generator can generate electric energy throughout the entire reciprocating process of resonance, and the electric energy generation efficiency is high.
3. A thyristor and Zener diode designed in the electric energy management unit in the present disclosure can implement current rectification without a need of an external power supply.
4. The present disclosure adopts the optical communication mode to transmit the sensing data, and the transmission process has additional impact on the transmission line.

BRIEF DESCRIPTION OF THE DRAWINGS

The present disclosure will be described with reference to the embodiments and accompanying drawings.

DETAILED DESCRIPTION

Except contradictory features and/or steps, all features, methods, or steps in a process which are disclosed in this specification can be combined in any manner.

Unless otherwise explicitly specified, any feature disclosed in this specification (including any claim and the abstract) can be substituted by features with purposes similar to that of the one before or be substituted by equivalent features, that is, each feature is just an example of the features with the purposes similar to that of the one before, or an example of a series of equivalent features.

Terms such as "first" and "second" involved in the present disclosure are merely used to distinguish corresponding technical feature objects, and do not limit whether the technical features are the same.

EMBODIMENT 1

Figure 1:
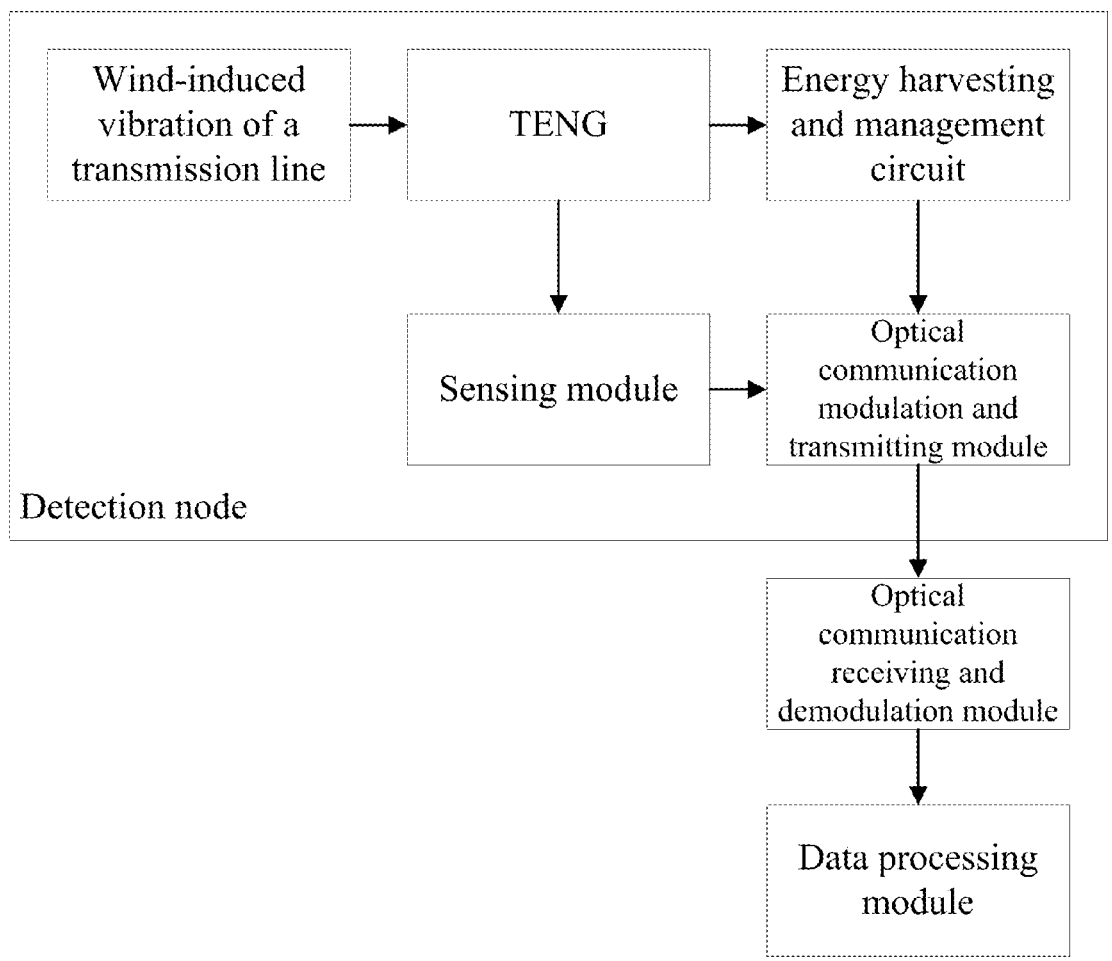
FIG. 1 is a structural diagram of a multi-sensor data fusion-based self-powered online monitoring system for a transmission line.

This embodiment discloses a multi-sensor data fusion-based self-powered online monitoring system for a transmission line. As shown in FIG. 1, the system includes at least one detection node, an optical communication receiving and demodulation module, and a data processing module.

Figure 13:
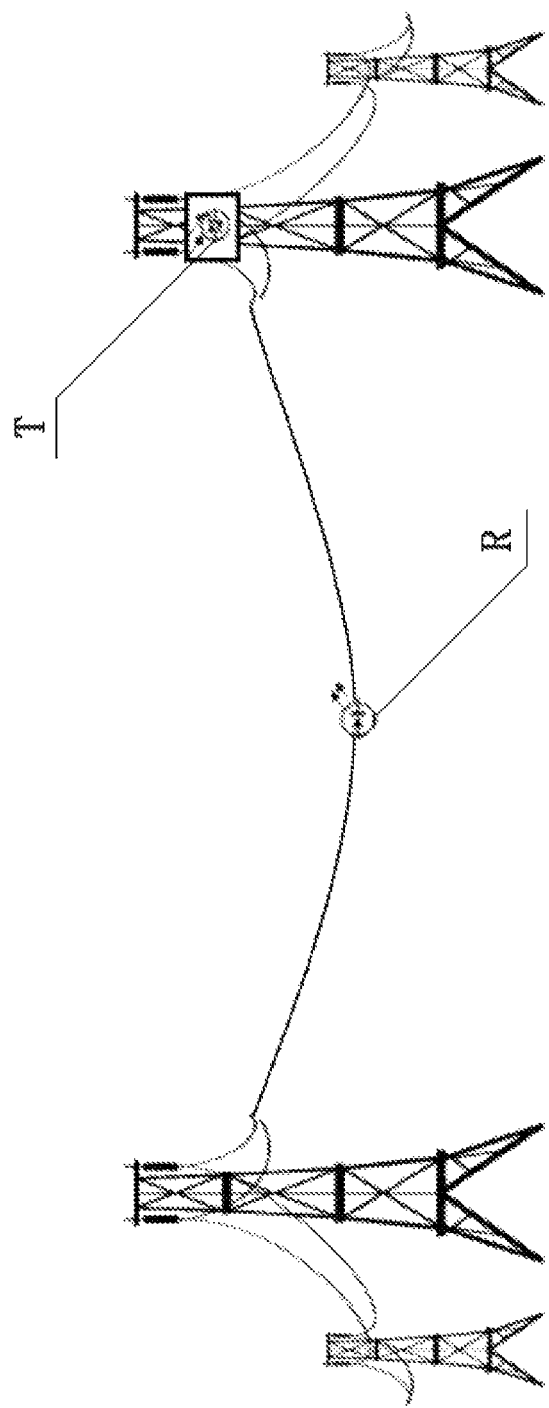
FIG. 13 shows an embodiment of mounting detection nodes and optical communication modulation and transmitting modules.

The detection node is configured to detect sensing data such as a temperature, humidity, an amplitude, a frequency, an angle of inclination, and other parameters at a corresponding stage. Each detection node integrates sensors such as a temperature sensor, a humidity sensor, a transmission line inclination sensor, and an acceleration sensor. All sensors are sensing modules. An optical communication modulation and transmitting module modulates the sensing data detected by the detection node into an optical signal and radiates the optical signal into the air. A vibration energy harvesting module supplies power to the detection node. The vibration energy harvesting module harvests wind-induced vibration energy and converts it into electric energy for storage, to supply power to the detection node. The vibration energy harvesting module adopts a contact-separation mode TENG to harvest the vibration energy. Generally, the detection node is mounted on a transmission line, and detection nodes are disposed at intervals of a specific distance, as shown in FIG. 13. The transmission line vibrates under the action of a breeze. Under the action of breeze vibration, friction (such as contact-separation friction) is generated between electric energy generation materials of the TENG and with different characteristics. The material characteristics drive generation of current, and an electrical signal is output. In this way, mechanical energy is converted into electric energy. The electric energy is harvested and stored by an energy harvesting and management circuit to supply power to the entire detection node.

The optical communication receiving and demodulation module acquires the optical signal radiated into the air, which is a visible optical signal, performs optoelectronic conversion on the acquired optical signal, uses an inverse method of the modulation to demodulate converted signal, and sends demodulated data to the data processing module. Generally, the optical communication receiving and demodulation module is mounted on a tower, and a chemical battery such as a lithium-ion battery can be mounted on the tower. This facilitates mounting and replacement. The data processing module is generally mounted in a remote monitoring room, and data communication between the optical communication receiving and demodulation module and the data processing module is implemented in a wireless or wired manner. In an implementation example, the data processing module may be a processor with an operation function, an operation chip, or the like.

Each detection node includes various parameter sensors, and each parameter sensor acquires corresponding sensing data. Therefore, the data acquired by the sensing module can be classified into a plurality of types. The data processing module uses a two-layer model to analyze and process the sensing data acquired by each sensing module. At a first layer, a weighted least square method is used to fuse homogeneous sensing data and analyze similarity between the homogeneous sensing data, so as to reduce impact of ambient noise and a sensor error on a measurement result, improve accuracy of sensor monitoring data, and obtain a first fusion parameter corresponding to each type of sensing data. For example, the weighted least square method is used to fuse temperature sensing data acquired by each sensing module to obtain a first fusion parameter corresponding to the temperature, and the same is true for other types (such as humidity) of sensing data. At a second layer, a fuzzy comprehensive evaluation method is used to analyze each type of first fusion parameter, and a different weight is assigned to each type of first fusion parameter to obtain a second fusion parameter, which is used as a monitoring result.

Figure 2:
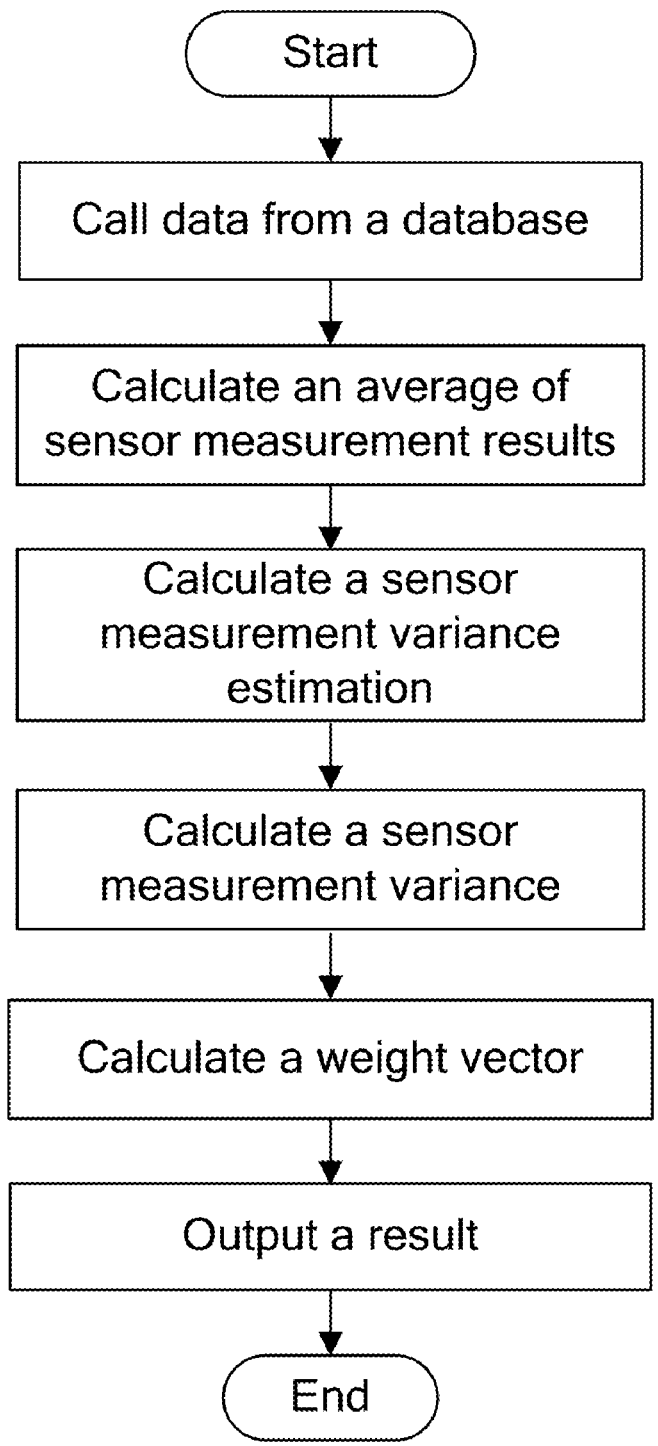
FIG. 2 is a flowchart of fusing homogeneous sensing data.

Based on an error theory, a least square method determines an optimal function that matches the data by finding a minimum error square. It is a method with a smallest error and highest accuracy in data processing. The weighted least square method assigns different weights to different data based on the least square method, that is, assigns a large weight to data with a small error and assigns a small weight to data with a large error to reduce impact of the data with the large error on the system. In the monitoring system for a transmission line, the weighted least square method is used to estimate original data of a same type of sensor acquired by each sensor node to obtain a data fusion function model of the same type of sensor. If an error of data is large, the data may be eliminated and replaced, to improve accuracy of measurement data. FIG. 2 is a flowchart of data fusion modeling for homogeneous sensing data based on a weighted least square method.

One type of sensing data is used as an example herein. Assume that sensing modules acquire n sets of homogeneous sensing data, namely, homogeneous sensing data acquired by n detection nodes. A real value is denoted by x. n measurement values $y_i$ (i=1, 2 ... n) of the system are an n-dimensional system measurement vector Y, and $Y=[y_1 y_2 y_3 \ldots y_n]^T$. Ambient noise and sensor noise are uniformly represented by an n-dimensional noise vector e, and $e=[e_1 e_2 e_3 \ldots e_n]^T$. A detection equation for n sensors to detect a specific ambient characteristic status parameter of the system is $Y=Hx+e$, where H represents an n-dimensional known constant vector, and $H=[1 1 1 \ldots 1]^T$. If $y_{mi}$ represents an $m^{th}$ measurement result of an $i^{th}$ sensor, $y_m$ represents an average value of a measurement result of each sensor, and $\varepsilon_i$ represents a measurement variance of each sensor, a measurement variance of the $m^{th}$ measurement result of the $i^{th}$ sensor is estimated to be $\hat{\varepsilon}_{mi}^2$. The estimated value of the measurement variance is $$\hat{\varepsilon}_{mi}^2 = \frac{n}{n-2}\left[\hat{\varepsilon}_{mi}^2 - \frac{1}{n(n-1)}\sum_{j=1}^{n}\hat{\varepsilon}_{m_i}^2\right].$$

the measurement variance of the sensor is $$\varepsilon_i^2 = \frac{1}{M}\sum_{k=1}^{M}\varepsilon_{ki}^2,$$

and a weight vector is $$W_i = \frac{1}{\varepsilon_i^2},$$

where M represents a total number of measurement results of the $i^{th}$ sensor, and $\varepsilon_{ki}^2$ represents a measurement variance of a $k^{th}$ measurement result of the $i^{th}$ sensor. An estimated value $\hat{x}$ of the real value x is $$\hat{x} = \frac{\sum_{i=1}^{n}\frac{y_i}{\varepsilon_i^2}}{\sum_{i=1}^{n}\frac{1}{\varepsilon_i^2}}.$$

The system uses the weighted least square method to calculate an estimated status variance of a first-level data fusion result:

$$E[(x-\hat{x})^2] = \frac{1}{\sum_{i=1}^{n} \frac{1}{\varepsilon_i^2}}.$$

It can be learned from a comparison formula $$\frac{1}{\sum_{i=1}^{n} \frac{1}{\varepsilon_i^2}} \le \frac{1}{n^2} \sum_{i=1}^{n} \varepsilon_i^2$$

that an effect of data fusion based on the weighted least square method is better than that of traditional data fusion based on arithmetic average estimation. A least square estimation of $\hat{x}$ when minimum values of an error square and $A_w(\hat{x})=(Y-H\hat{x})^T W(Y-H\hat{x})$ are used can be expressed as $\hat{x}=(H^T W H)^{-1} H^T W Y$, where W represents a matrix $W=diag(W_1 W_2 W_3 \ldots W_n)$ formed by weight vectors, and the weight vector is $$W_i = \frac{1}{\varepsilon_i^2}.$$

A weighted least square estimation of sensor measurement data can be obtained by performing the foregoing steps.

Figure 3:
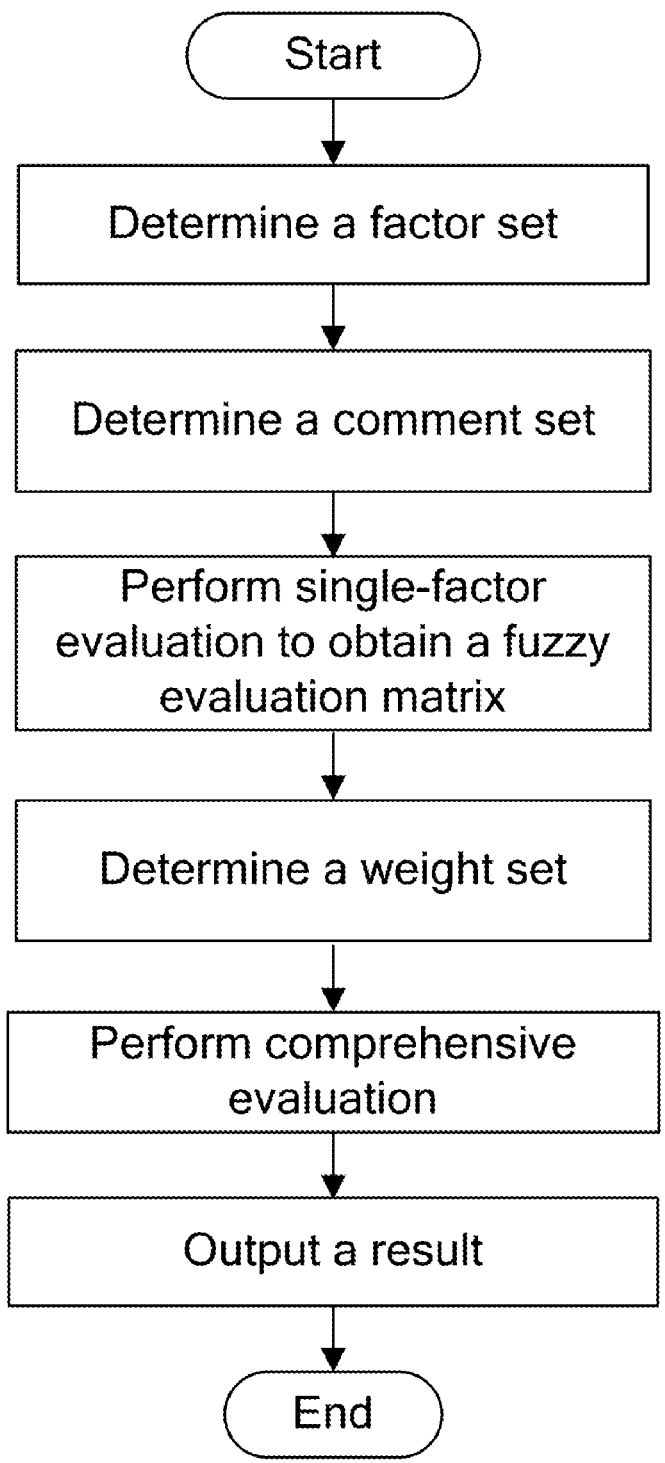
FIG. 3 is a flowchart of fusing heterogeneous sensing data.

In a fuzzy comprehensive evaluation method, a plurality of evaluation factors of a to-be-evaluated object are provided. These evaluation factors form an evaluation factor set, and can comprehensively reflect the quality or status of the to-be-evaluated object. Then, an evaluation factor level or comment set is set. Next, a specific weight is set for each factor based on a position of each factor or a role that each factor plays in the evaluation to form a weight set. Before comprehensive evaluation, single-factor evaluation is performed on each factor to obtain an evaluation. A plurality of evaluations form a fuzzy relationship matrix. After a synthesis operator is finally determined, a fuzzy comprehensive evaluation result is obtained through synthesis of fuzzy relationships. FIG. 3 is a flowchart of fusing heterogeneous sensing data based on the fuzzy comprehensive evaluation method.

Corresponding to FIG. 3, this embodiment uses four types of sensing data including a temperature, humidity, an angle of inclination, and an acceleration as an example to describe a data processing procedure at the second layer. The fuzzy comprehensive evaluation method includes the following procedure:

(1) Determine a factor set $U=\{u_1, u_2, u_3, u_4\}$.

Four characteristics including the temperature, humidity, angle of inclination, and acceleration can comprehensively reflect the status of a to-be-evaluated object. The evaluation factor set in this embodiment is expressed as follows:

$U=\{u_1, u_2, u_3, u_4\}=\{$temperature, humidity, angle of inclination, acceleration$\}$ (2) Determine a comment set $V=\{v1, v_2, v_3, \ldots, v_m\}$.

The status of the transmission line is classified into good, medium, and poor based on types and value ranges of ambient characteristic parameters detected by the online monitoring system for a transmission line. Good indicates that the transmission line is in a good state. Medium indicates that the transmission line is in a normal state, and changes of the status of the transmission line need to be monitored in real time and be on the alert. Poor indicates that the transmission line is in a poor state, there may be a relatively large hidden danger, and specific measures need to be taken for the transmission line based on abnormal ambient characteristic factors to prevent accidents. Therefore, the comment set may be expressed as follows:

$V=\{v_1, v_2, v_3\}=\{$good; medium; poor$\}$ (3) Perform single-factor evaluation to obtain a fuzzy evaluation matrix R.

Single-factor evaluation is performed once on each evaluation factor $u_i$ ($i\in[1,n]$) in the evaluation factor set U based on a fuzzy mathematics theory. A membership degree of the evaluation factor of the evaluated object to each evaluation factor level is determined. The fuzzy evaluation matrix R of the system can be finally calculated based on the membership degree.

$$R = \begin{bmatrix} r_{11} & r_{12} & r_{13} \\ r_{21} & r_{22} & r_{23} \\ r_{31} & r_{32} & r_{33} \\ r_{41} & r_{42} & r_{43} \end{bmatrix}$$

where $r_{ij}$ represents the membership degree of the evaluation factor of the comprehensively evaluated object to the evaluation factor level.

(4) Determine a weight set $W=\{w_1, w_2, w_3, \ldots, w_n\}$.

A weight $w_i$ of an evaluation factor represents importance and impact of the factor in the system for comprehensively evaluating the health status of the monitored transmission line. An analytic hierarchy process (AHP) is used to determine the weight set $W=\{w_1, w_2, w_3, \ldots, w_n\}$.

(5) Perform comprehensive evaluation.

A final result Y can be calculated based on the evaluation matrix R and weight vector W obtained in the foregoing steps.

$Y = W \circ R = [y_1, y_2, y_3]$ where an operator $\circ$ represents a weighted average fuzzy relationship synthesis operation. $y_1$, $y_2$, $y_3$ represent membership degrees to the evaluation levels including good, medium, and poor of the status of the transmission line according to a national standard, respectively. $y_1$ corresponds to good, $y_2$ corresponds to medium, and $y_3$ corresponds to poor. A larger value indicates a higher membership degree of the transmission line to the level.

Ambient status evaluation of the online monitoring system for a transmission line in this embodiment comprehensively considers evaluation of the ambient status of a target area by integrating measurement results of various ambient characteristic parameters. The comprehensive evaluation is safety level evaluation of the ambient status of the target area based on the various measured ambient characteristic parameters.

EMBODIMENT 2

This embodiment discloses a structure of a vibration energy harvesting module.

The vibration energy harvesting module includes a TENG and an electric energy management unit 3. The electric energy management unit 3 includes a rectifier bridge and a filter circuit. An output terminal of the TENG is connected to the rectifier bridge, and the rectifier bridge obtains charges output by the TENG. The rectifier bridge is connected to the filter circuit, and the charges are input to the filter circuit for rectification and output.

Figure 4:
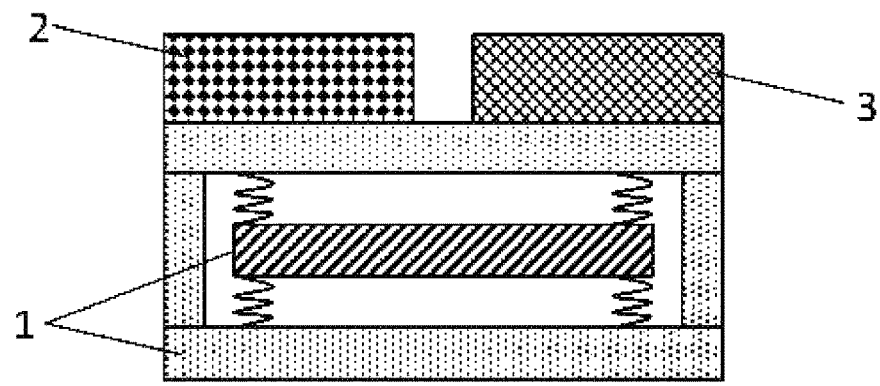
FIG. 4 is a schematic structural diagram of a breeze vibration acquisition apparatus for a transmission line.

In some embodiments, as shown in FIG. 4, the vibration energy harvesting module includes at least one first triboelectric generation module 1, a same number of charge auxiliary circuits 2 as the first triboelectric generation module 1, and the electric energy management unit 3. The triboelectric generation module 1 includes a triboelectric generation mechanism 11 and at least one variable capacitor 12. A triboelectric nanogeneration unit has a spring resonance triboelectric nanogeneration structure.

The vibration energy harvesting module as a whole has a vertical contact-separation mode triboelectric generation structure. For triboelectric generation components, the first triboelectric generation module 1 has a spring resonance triboelectric generation structure.

The triboelectric generation mechanism 11 includes a first electrode 11a, a first dielectric film 11b, and a second electrode 11c. The first dielectric film 11b is negatively charged, and the first dielectric film 11b is disposed on the first electrode 11a.

Figure 5:
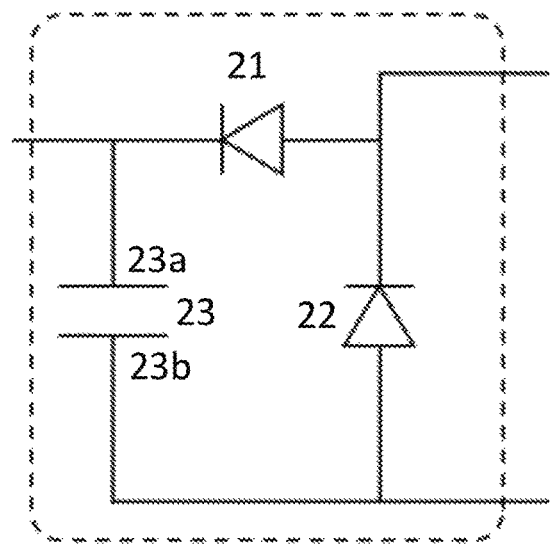
FIG. 5 is a structural diagram of a charge auxiliary circuit.

As shown in FIG. 5, the charge auxiliary circuit 2 includes a first diode 21, a second diode 22, and a first capacitor 23. A positive electrode of the first diode 21 and a negative electrode of the second diode 22 are connected to the first electrode 11a. A negative electrode of the first diode 21 is connected to a first terminal 23a of the first capacitor. A second terminal 23b of the first capacitor and a positive electrode of the second diode 22 are connected to the second electrode 11c. The first terminal 23a of the first capacitor serves as a first output terminal of the charge auxiliary circuit 2, and the second terminal 23b of the first capacitor serves as a second output terminal of the charge auxiliary circuit 2.

An example in which there is one variable capacitor is used to describe a structure of each variable capacitor 12 in the first triboelectric generation module 1. The same applies to other variable capacitors. One electrode of the variable capacitor 12 is connected to the first output terminal of the charge auxiliary circuit 2 through a rectifier bridge 31. In other words, the electrode and the first output terminal of the charge auxiliary circuit 2 are respectively connected to two alternating current input terminals of the rectifier bridge 31. The other electrode of the variable capacitor 12 is connected to the second output terminal of the charge auxiliary circuit 2. The vibration energy harvesting module is designed with the charge auxiliary circuit 2 and the adapted variable capacitor 12. This can efficiently convert micro-vibration mechanical energy into electric energy. The energy harvesting apparatus designed based on a triboelectric nanogeneration technology has a small size and low weight.

Figure 6:
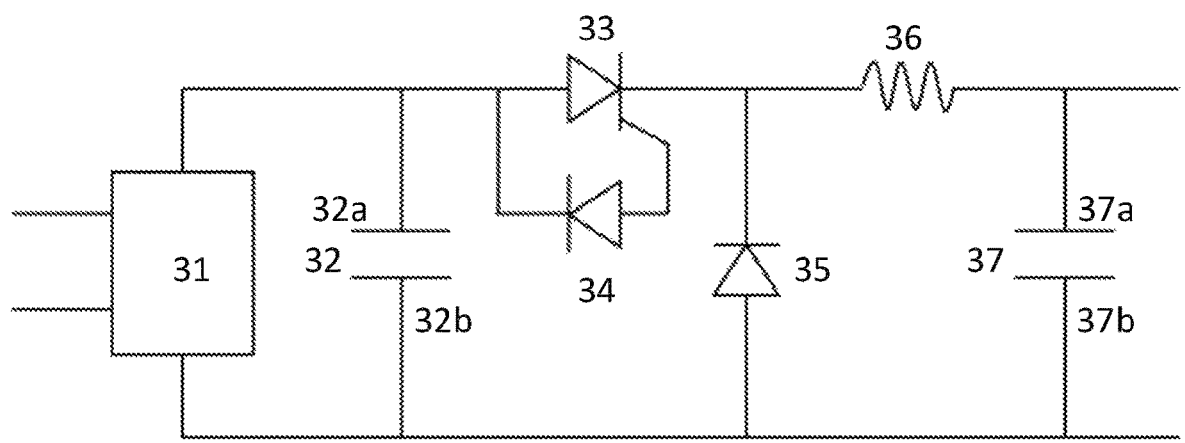
FIG. 6 is a circuit diagram of an electric energy management unit.

The electric energy management unit 3 includes the rectifier bridge 31 and a filter circuit connected to the rectifier bridge 31. The filter circuit outputs direct current power. The filter circuit includes a charge storage circuit, a threshold switch circuit, and a semioscillation circuit that are connected in sequence. The charge storage circuit is connected to the rectifier bridge. As shown in FIG. 6, the electric energy management unit 3 includes the rectifier bridge 31, a second capacitor 32, a thyristor 33, a Zener diode 34, a third diode 35, a first inductor 36, and a third capacitor 37. The second capacitor 32 is connected in parallel with two direct current output terminals of the rectifier bridge 31. An anode of the thyristor 33 and a negative electrode of the Zener diode 34 are connected to a first terminal 32a of the second capacitor. A cathode of the thyristor 33 is connected to a negative electrode of the third diode 35. A gate electrode of the thyristor 33 is connected to a positive electrode of the Zener diode 34. The negative electrode of the third diode 35 is connected to a first terminal 37a of the third capacitor through the first inductor 36. A positive electrode of the third diode 35 and a second terminal 37b of the third capacitor are connected to a second terminal 32b of the second capacitor. Both terminals of the third capacitor 37 output direct current power. After the charges output by the first triboelectric generation module 1 pass through the rectifier bridge 31, the charges are stored in the second capacitor 32. When a voltage reaches a specific value, a threshold switch composed of the thyristor 33 and the Zener diode 34 is automatically short-circuited to instantly release electric field energy stored in the second capacitor 32 into a semioscillation circuit composed of the third diode 35, the first inductor 36, and the third capacitor 37. Energy is converted from strong electric field energy in the second capacitor 32 into magnetic field energy in the first inductor 36, and then into low electric field energy in the third capacitor 37, to optimize utilization efficiency of electric energy output by the first triboelectric generation module 1 and power consumed by sensing components.

Figure 7:
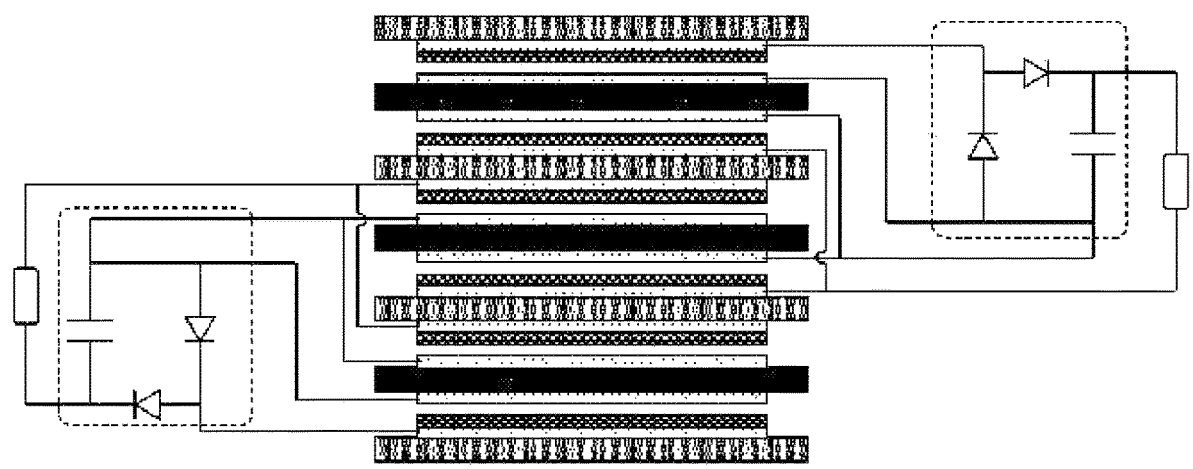
FIG. 7 shows an embodiment of a vibration energy harvesting module including two sets of first triboelectric generation modules and charge auxiliary circuits.

In the vibration energy harvesting module, the number of first triboelectric generation modules 1 can be flexibly designed based on site conditions and requirements. Correspondingly, the number of charge auxiliary circuits 2 can also be doubled. In other words, one first triboelectric generation module 1 and one charge auxiliary circuit 2 is a complete set of design, and each set of circuits is connected to the rectifier bridge 31 of the electric energy management unit 3. FIG. 7 shows an embodiment of a vibration energy harvesting module including two first triboelectric generation modules 1 and two charge auxiliary circuits 2. One first triboelectric generation module 1 includes two variable capacitors 12. Triboelectric generation mechanisms 11 and the variable capacitors 12 are stacked. Specifically, assume that the two first triboelectric generation modules 1 are a first triboelectric nanogeneration unit and a second triboelectric nanogeneration unit. The triboelectric generation mechanisms 11 of the two triboelectric nanogeneration units are disposed at two ends of the stacking structure. First variable capacitors 12 of the first triboelectric nanogeneration unit and the second triboelectric nanogeneration unit are adjacent to their own triboelectric generation mechanisms 11. Second variable capacitors 12 of the first triboelectric nanogeneration unit and the second triboelectric nanogeneration unit are alternated. In this way, electrodes of some variable capacitors can be fastened together to reduce the size.

EMBODIMENT 3

Figure 8:
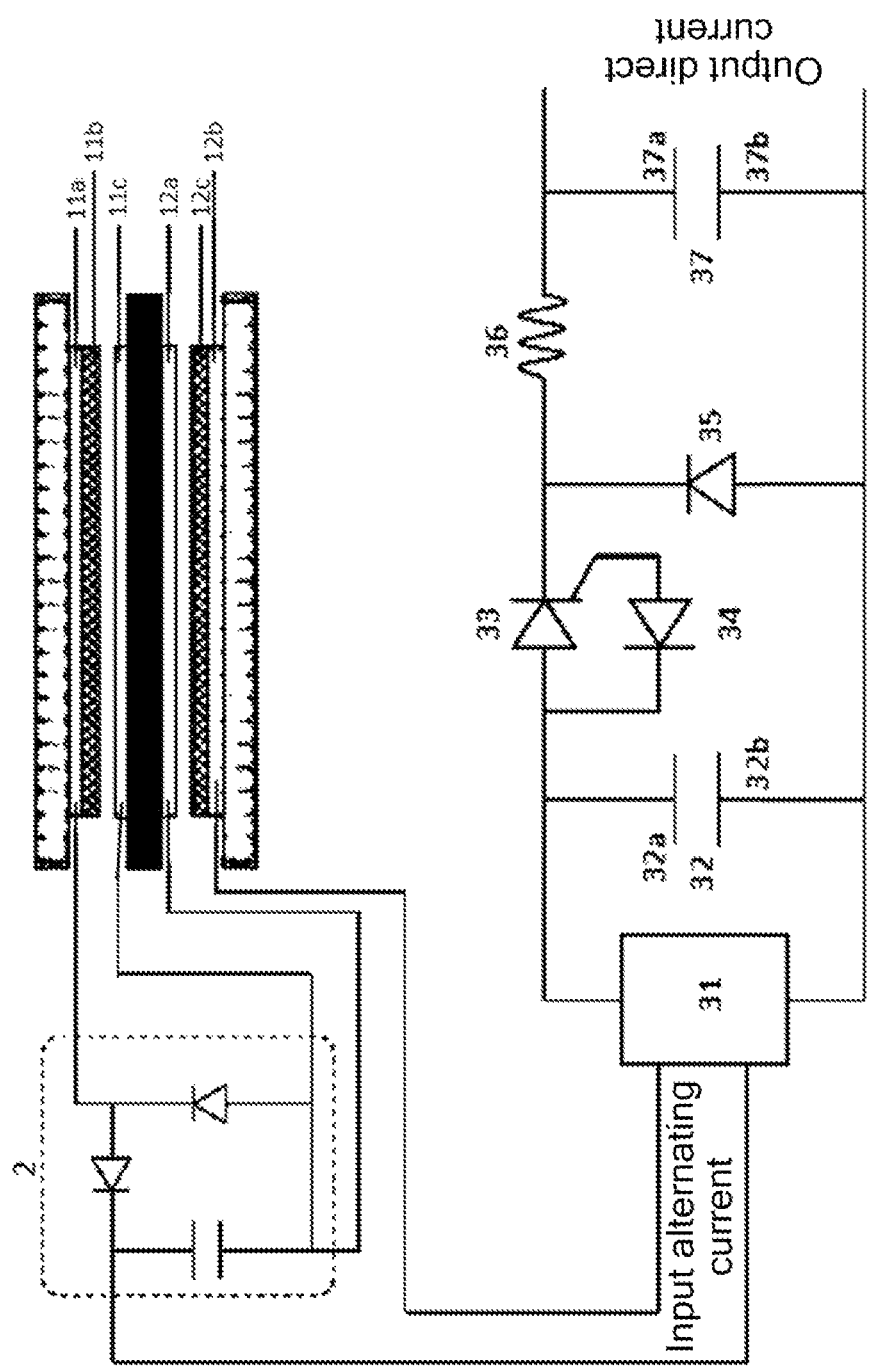
FIG. 8 shows an embodiment of a vibration energy harvesting module including one set of a first triboelectric generation module and a charge auxiliary circuit.

As shown in FIG. 8, this embodiment uses an example in which a vibration energy harvesting module includes one first triboelectric generation module 1, and the first triboelectric generation module 1 includes one variable capacitor 12 to describe a structure of the vibration energy harvesting module.

The vibration energy harvesting module includes a triboelectric generation mechanism 11, the variable capacitor 12, a charge auxiliary circuit 2, and an electric energy management unit 3.

The triboelectric generation mechanism 11 has a vertical contact-separation mode structure. The triboelectric generation mechanism 11 includes a first electrode 11a, a first dielectric film 11b, and a second electrode 11c. The first dielectric film 11b is negatively charged, and the first dielectric film 11b is disposed on the first electrode 11a.

The charge auxiliary circuit 2 includes a first diode 21, a second diode 22, and a first capacitor 23. A positive electrode of the first diode 21 and a negative electrode of the second diode 22 are connected to the first electrode 11a. A negative electrode of the first diode 21 is connected to a first terminal 23a of the first capacitor. A second terminal 23b of the first capacitor and a positive electrode of the second diode 22 are connected to the second electrode 11c.

The variable capacitor 12 includes a third electrode 12a and a fourth electrode 12b. The third electrode 12a is connected to the second terminal 23b of the first capacitor, and the fourth electrode 12b is connected to the first terminal 23a of the first capacitor through a rectifier bridge 31.

The electric energy management unit 3 includes the rectifier bridge 31, a second capacitor 32, a thyristor 33, a Zener diode 34, a third diode 35, a first inductor 36, and a third capacitor 37. The second capacitor 32 is connected in parallel with two direct current output terminals of the rectifier bridge 31. An anode of the thyristor 33 and a negative electrode of the Zener diode 34 are connected to a first terminal 32a of the second capacitor. A cathode of the thyristor 33 is connected to a negative electrode of the third diode 35. A gate electrode of the thyristor 33 is connected to a positive electrode of the Zener diode 34. The negative electrode of the third diode 35 is connected to a first terminal 37a of the third capacitor through the first inductor 36. A positive electrode of the third diode 35 and a second terminal 37b of the third capacitor are connected to a second terminal 32b of the second capacitor. Both terminals of the third capacitor 37 output direct current power.

In some embodiments, a structure of the variable capacitor 12 is designed to be similar to that of the triboelectric generation mechanism 11. The variable capacitor 12 includes the third electrode 12a and the fourth electrode 12b. A second dielectric film 12c is disposed on the fourth electrode 12b. No charges are injected into the second dielectric film 12c to implement insulation and isolation, such that the third electrode 12a and the fourth electrode 12b do not come into contact during vibration. The variable capacitor 12 and the triboelectric generation mechanism 11 are stacked. The third electrode 12a of each variable capacitor 12 and the second electrode 11c remain relatively static and vibrate synchronously. For example, the third electrode 12a of the uppermost variable capacitor 12 and the second electrode 11c are disposed on a board of a same layer.

Figure 9:
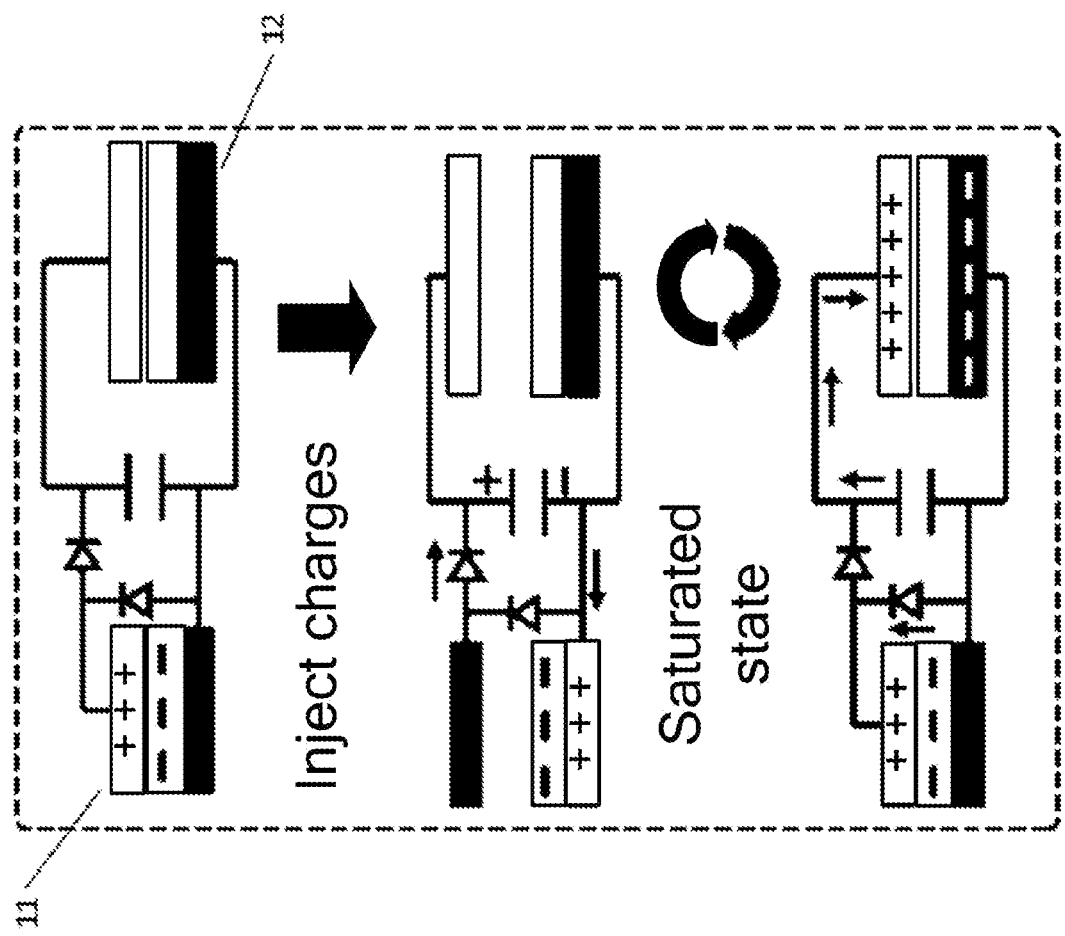
FIG. 9 is a working status diagram of a charge auxiliary circuit and a variable capacitor.

As shown in FIG. 9, under the action of breeze vibration, periodic contact and separation are performed between the first dielectric film 11b and the second electrode 11c of the triboelectric generation mechanism 11. The first electrode 11a and the second electrode 11c periodically charge the first capacitor 23. Charges in the first capacitor 23 continuously charge the variable capacitor 12. Under the action of the breeze vibration, the third electrode 12a of the variable capacitor 12 periodically moves close and away from the fourth electrode 12b to output current. Because the first capacitor 23 continuously injects the charges into the variable capacitor 12, and the charges are not limited by initial charges, output power is greater than that of the triboelectric generation mechanism 11, and energy conversion efficiency is higher.

EMBODIMENT 4

This embodiment discloses an implementation in which a vibration energy harvesting module includes two integrated first triboelectric generation modules 1. The two first triboelectric generation modules 1 form a triboelectric nanogeneration structure.

Figure 10:
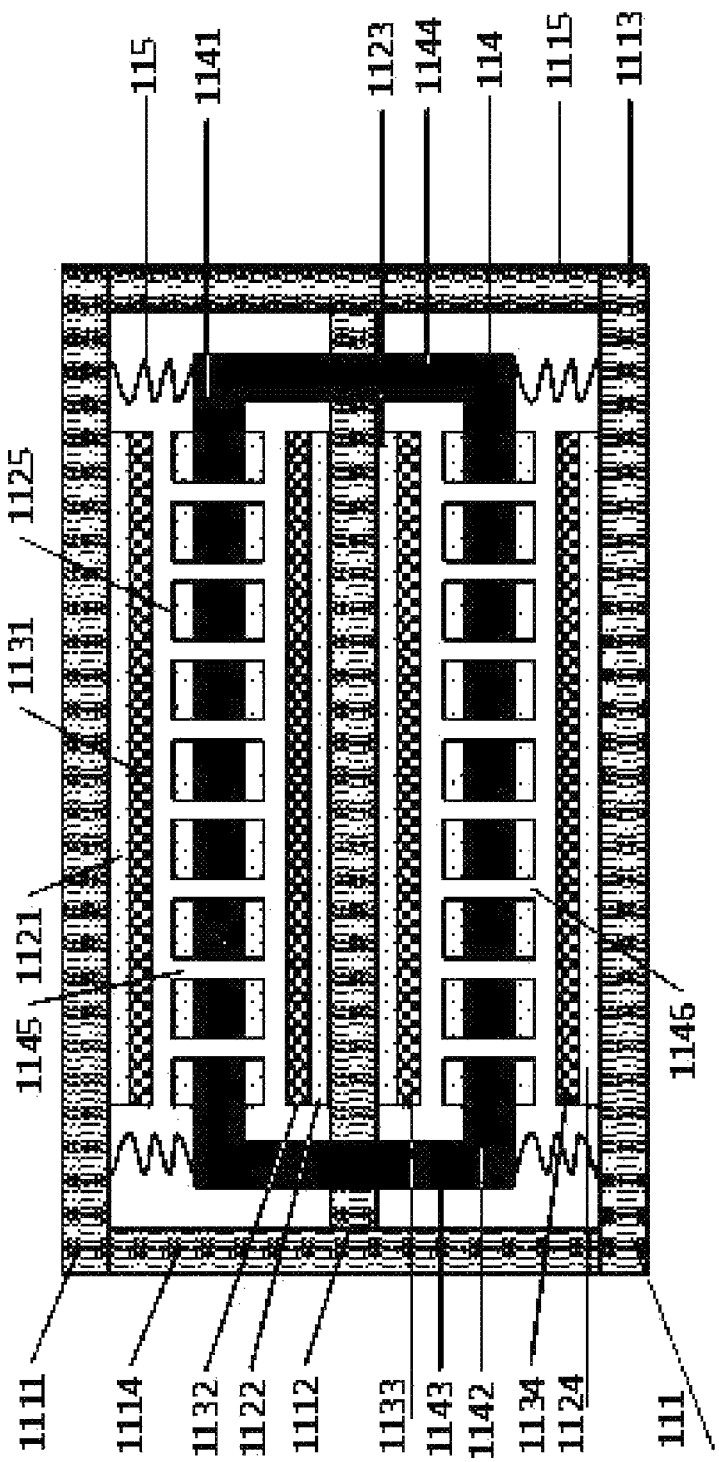
FIG. 10 shows an embodiment of a structure of a TENG.

As shown in FIG. 10, the triboelectric nanogeneration structure includes a fastening frame 111. The fastening frame 111 includes three layers of boards: a first-layer board 1111, a second-layer board 1112, and a third-layer board 1113 arranged in an upper, middle and lower structure at intervals and fastened through a first side board 1114 and a second side board 1115 on both sides. A first electrode layer 1121 and a first dielectric material layer 1131 are subsequently disposed on a lower surface of the first-layer board 1111. A second electrode layer 1122 and a second dielectric material layer 1132 are subsequently disposed on an upper surface of the second-layer board 1112. A third electrode layer 1123 and a third dielectric material layer 1133 are subsequently disposed on a lower surface of the second-layer board 1112. A fourth electrode layer 1124 and a fourth dielectric material layer 1134 are subsequently disposed on an upper surface of the third-layer board 1113. A movable member 114 is disposed in the fastening frame 111. Upper and lower sides of the movable member 114 maintain a gap with the fastening frame 111 through resonance springs 115, and up and down swing are implemented. The movable member 114 includes a fourth-layer board 1141 and a fifth-layer board 1142. The fourth-layer board 1141 is located between the first-layer board 1111 and the second-layer board 1112, and the fifth-layer board 1142 is located between the second-layer board 1112 and the third-layer board 1113. The fourth-layer board 1141 and the fifth-layer board 1142 are fastened as a whole through a third side board 1143 and a fourth side board 1144 on both sides. Fifth electrode layers 1125 are disposed on upper and lower surfaces of the fourth-layer board 1141. Sixth electrode layers 1126 are disposed on upper and lower surfaces of the fifth-layer board 1142. Further, because the dielectric material layers are very flat, to prevent the movable member 114 from adhering to the dielectric material layers when swinging, a first air hole 1145 is provided through the fourth-layer board 1141 and the fifth electrode layer 1125, and a second air hole 1146 is provided through the fifth-layer board 1142 and the sixth electrode layer 1126.

With the foregoing structure, the two first triboelectric generation modules 1 are integrally designed as a whole. On this basis, a plurality of first triboelectric generation modules may be integrated by increasing the number of layer boards of the fastening frame 111, the number of layer boards of the movable member 114, the number of electrode layers, and the number of dielectric material layers.

EMBODIMENT 5

This embodiment discloses another structure of a vibration energy harvesting module.

In some embodiments, a TENG includes at least one second triboelectric generation module 4. The second triboelectric generation module 4 includes a first electrode portion 41 and a second electrode portion 42 that match each other. The first electrode portion 41 includes a dielectric film layer and an electrode layer. The second electrode portion 42 is a spring resonance structure. The electrode layer of the first electrode portion 41 and the second electrode portion 42 serve as output terminals of the second triboelectric generation module 4. Preferably, a side of the first electrode portion 41 close to the second electrode portion 42 may be arc-shaped. This design can improve electric energy generation efficiency of the generator when the second electrode portion 42 vibrates. Specifically, an arc equation of the side of the first electrode portion 41 close to the second electrode portion 42 is an arc when the second electrode portion 42 vibrates and is curved. Therefore, the second electrode portion 42 completely fits the first electrode portion 41 when vibrating.

The number of second triboelectric generation modules 4 included in the TENG has no impact on the implementation of the solution of the present disclosure, but has impact on the electric energy generation efficiency and size of the generator. Preferably, in the present disclosure, the number of second triboelectric generation modules 4 is an even number, which are designed in pairs. A pair of second triboelectric generation modules 4 share the second electrode portion 42, that is, share the spring resonance structure. The second triboelectric generation modules 4 are stacked. When a transmission line vibrates, the second electrode portion 42 is excited to vibrate, and periodic contact-separation movements are performed between the second electrode portion 42 and upper and lower dielectric film layers. A surface of the dielectric film layer generates bound surface negative charges due to contact friction. When the second electrode portion 42 is in contact with the upper dielectric film layer, positive charges are induced, and negative charges appear in an upper electrode layer. When the second electrode portion 42 is separated from the upper dielectric film layer, positive charges appear in the upper electrode layer, and the second electrode portion 42 generates negative charges. When the second electrode portion 42 is in contact with the lower dielectric film layer, the second electrode portion 42 induces positive charges, and negative charges appear in a lower electrode layer. The charges of the electrode layer and the second electrode portion 42 flow back and forth between the second electrode portion 42 and the electrode layers during the contact-separation process to form electric energy for output.

Figure 11:
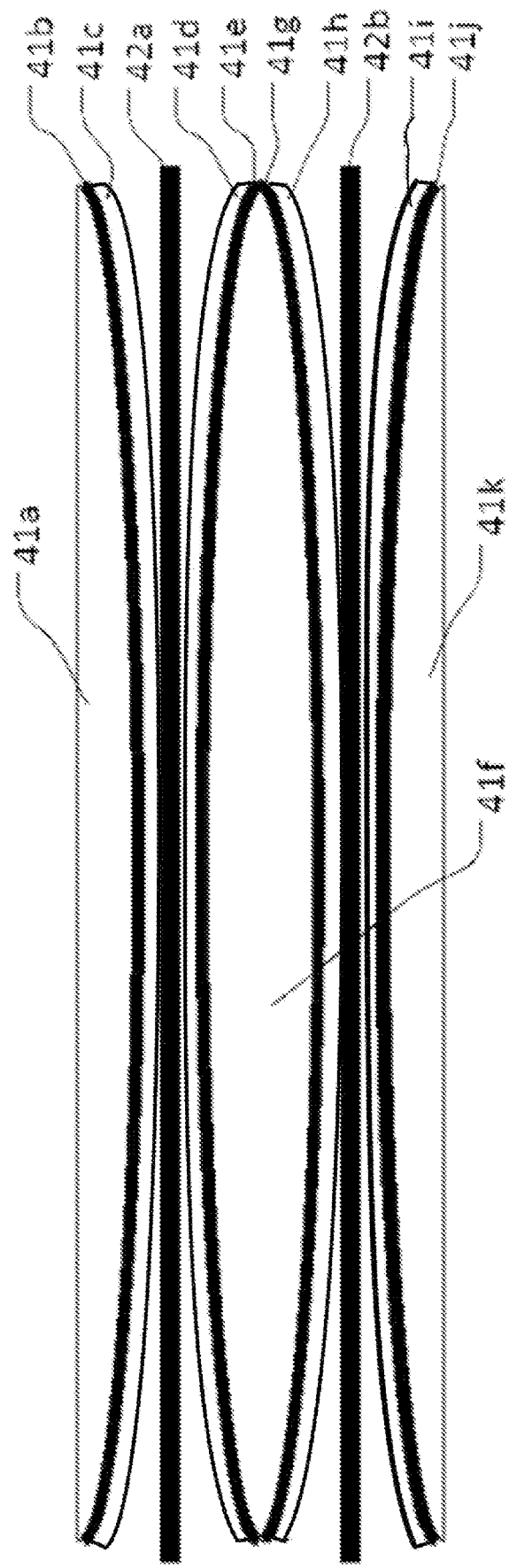
FIG. 11 shows an embodiment of a TENG including four second triboelectric generation modules.

As shown in FIG. 11, this embodiment is described by an example in which a TENG includes four second triboelectric generation modules 4. The TENG includes a first support frame layer 41a, a first electrode layer 41b, a first dielectric film layer 41c, a first spring steel sheet 42a, a second dielectric film layer 41d, a second electrode layer 41e, a second support frame layer 41f, a third electrode layer 41g, a third dielectric film layer 41h, a second spring steel sheet 42b, a fourth dielectric film layer 41i, a fourth electrode layer 41j, and a third support frame layer 41k that are designed layer by layer. The first support frame layer 41a, the first electrode layer 41b, the first dielectric film layer 41c, and the first spring steel sheet 42a form one second triboelectric generation module 4. A side of the first support frame layer 41a close to the first spring steel sheet 42a is arc-shaped. The first electrode layer 41b and the first dielectric film layer 41c are sequentially disposed on the first support frame layer 41a. The first spring steel sheet 42a, the second dielectric film layer 41d, the second electrode layer 41e, and the second support frame layer 41f form one second triboelectric generation module 4. The second support frame layer 41f, the third electrode layer 41g, the third dielectric film layer 41h, and the second spring steel sheet 42b form one second triboelectric generation module 4. Sides of the second support frame layer 41f close to the first spring steel sheet 42a and the second spring steel sheet 42b are arc-shaped. The second electrode layer 41e and the third electrode layer 41g are respectively disposed on two sides of the second support frame layer 41f. The second dielectric film layer 41d and the third dielectric film layer 41h are respectively disposed on surfaces of the second electrode layer 41e and the third electrode layer 41g. The second spring steel sheet 42b, the fourth dielectric film layer 41i, the fourth electrode layer 41j, and the third support frame layer 41k form one second triboelectric generation module 4. A side of the third support frame layer 41k close to the second spring steel sheet 42b is arc-shaped. The fourth electrode layer 41j and the fourth dielectric film layer 41i are disposed on the arc-shaped side of the third support frame layer 41k layer by layer. The second electrode layer 41e and the third electrode layer 41g are connected to each other and form an output terminal to the outside. Specifically, the first electrode layer 41b serves as an output terminal, a connection of the second electrode layer 41e and the third electrode layer 41g serves as an output terminal, and the fourth electrode layer 41j serves as an output terminal. After the three output terminals are connected in parallel, they are connected to an input terminal of a rectifier bridge. The first spring steel sheet 42a serves as an output terminal, and the second spring steel sheet 42b serves as an output terminal. After the two output terminals are connected in parallel, they are connected to the other input terminal of the rectifier bridge.

Figure 12:
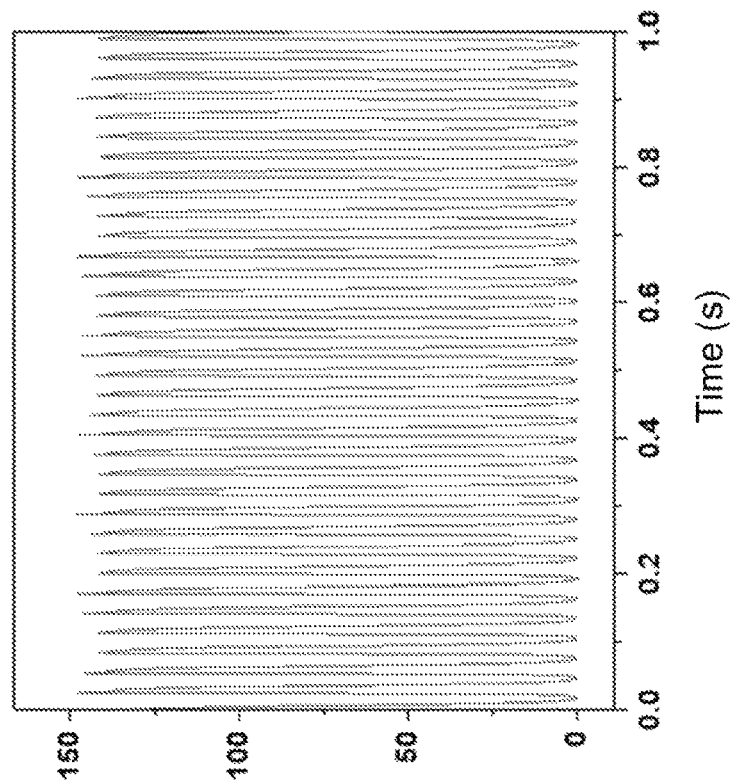
FIG. 12 is a test diagram of electric energy generation performance of the TENG shown in FIG. 11.
Figure 12:
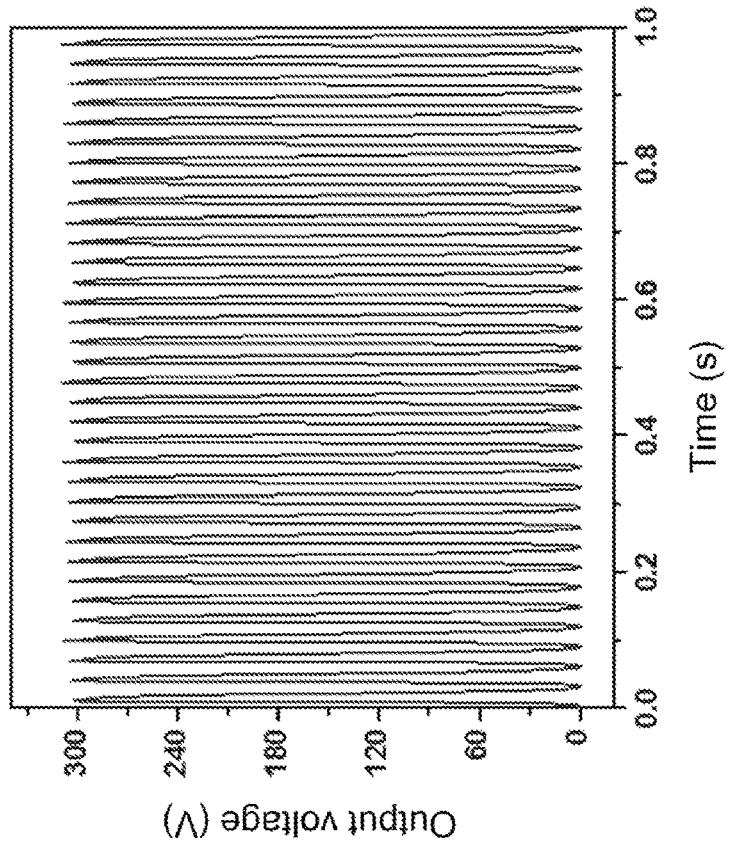

In the four second triboelectric generation modules 4 that are stacked, two spring steel sheets and one support frame layer are shared. This can effectively reduce the size of the generator. In addition, in this design, when the spring steel sheet vibrates in any direction, the module can output electric energy. FIG. 12 shows electric energy generation performance of the TENG designed in this embodiment.

EMBODIMENT 6

This embodiment uses an example in which a light-emitting diode (LED) lamp is used as a visible optical signal source to disclose a data communication mode between a detection node and an optical communication receiving and demodulation module.

Sensing modules of the detection node acquire sensing data such as a temperature, humidity, an amplitude, an angle of inclination, a frequency of an environment in which the detection node is located. A modulator in an optical communication modulation and transmitting module modulates the acquired sensing data to obtain a modulated signal. The modulation signal drives the LED lamp in the optical communication modulation and transmitting module to radiate an optical signal into the air.

The optical communication receiving and demodulation module receives the optical signal, an optoelectronic conversion device at a front end converts the optical signal into an electrical signal, and a demodulator demodulates the electrical signal obtained after the conversion to restore the sensing data. Obviously, the modulator and the demodulator are in a matching relationship.

Currently, most sensing monitoring nodes use traditional wireless communication technologies such as ZigBee based on a 2.4 GHz frequency band and Bluetooth communication, which generally have disadvantages such as high power consumption and electromagnetic interference (EMI) to other electronic elements. This embodiment uses a semiconductor lighting technology for optical communication, and has advantages such as environmental friendliness, low power consumption, good modulation performance, response sensitivity, and no interference.

EMBODIMENT 7

This embodiment discloses an implementation solution for acquiring, modulating, and transmitting sensing data including an amplitude and a frequency of wind-induced vibration of a transmission line.

Figure 14:
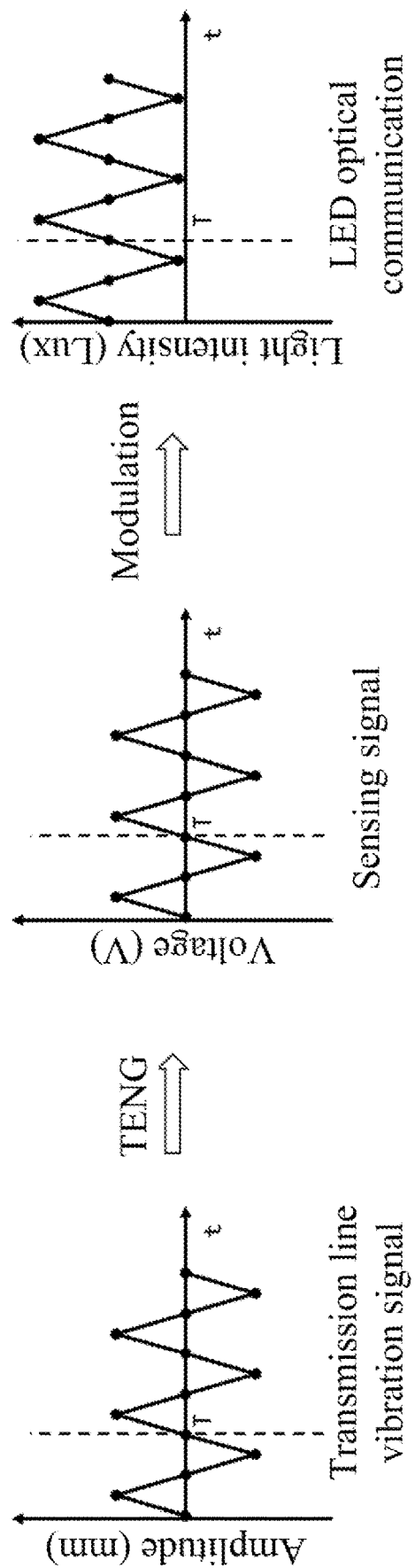
FIG. 14 is a status diagram of a vibration sensing data transmission process.

In this embodiment, a vibration energy harvesting module uses a TENG to harvest vibration energy. An electrical signal output when the TENG generates electric energy is harvested by an energy harvesting and management circuit and then stored as electric energy. In addition, an amplitude and a frequency of the electrical signal output by the TENG is positively related to the amplitude and frequency of the swing of the transmission line, which can reflect the vibration of the transmission line. Therefore, this embodiment uses the electrical signal as sensing data that reflects the vibration of the transmission line, without a need to mount sensors to monitor the vibration of the transmission line. In this embodiment, sensing modules obtain the electrical signal output by the TENG as the sensing data for vibration monitoring. In addition, the electrical signal output by the TENG is an analog signal, which can directly act on an LED lamp. Therefore, this embodiment also uses the electrical signal as a signal source for driving the LED lamp. However, considering that the electrical signal is alternating current, this embodiment uses a modulator such as a metal-oxide-semiconductor (MOS) modulator to simply modulate the electrical signal. As shown in FIG. 14, a reference voltage is added to the electrical signal to obtain a modulated signal. The modulated signal acts on the LED lamp to control an intensity and a frequency of light of the LED lamp to radiate an optical signal into the air, so as to implement wireless transmission of the sensing data. This process eliminates an encoding process and a corresponding device, and a decoding process and a corresponding decoder at a receive end of the optical signal.

Correspondingly, this embodiment also discloses a self-powered vibration monitoring method of a power transmission line based on LED optical communication, including the following steps:

Use a TENG to convert mechanical energy of vibration of a transmission line into electric energy for storage.

Obtain a first electrical signal output by the TENG.

Modulate the obtained first electrical signal to obtain a modulated signal.

Use the modulated signal to drive an LED lamp to radiate an optical signal into the air.

Use an optoelectronic conversion element to acquire the optical signal radiated into the air and convert the optical signal into a second electrical signal, and demodulate the second electrical signal in an inverse process of the modulation process to obtain target data. Report the demodulated target data.

This embodiment cleverly uses the electrical signal generated by the TENG in three ways, as an energy source at a self-power stage, a sensing signal that represents the swing of the transmission line, and a direct modulated signal source of the LED optical communication, to implement self-power of the system. This saves a sensing module, reduces power consumption and a size of the monitoring system, and implements lightweight of system components. The electrical signal is directly modulated to control the intensity and frequency of the light of the LED lamp. This saves encoding and decoding processes of the sensing signal, greatly reduces the workload of the system, improves efficiency of data acquisition and transmission, and improves real-time performance of monitoring.

The present disclosure is not limited to the foregoing embodiments. The present disclosure extends to any new feature or any new combination disclosed in this specification, and any new method or process step or any new combination disclosed.

The invention claimed is:

1. A multi-sensor data fusion-based self-powered online monitoring system for a transmission line, comprising at least one detection node, an optical communication receiving and demodulation module, and a data processing module, wherein the detection nodes each comprise a vibration energy harvesting module, a sensing module, and an optical communication modulation and transmitting module;

the vibration energy harvesting module is configured to harvest vibration energy and convert it into electric energy for storage, to supply power to the detection node;

the sensing module is configured to acquire a plurality of types of sensing data at a position of the detection node;

the optical communication modulation and transmitting module is configured to modulate the plurality of types of sensing data acquired by the sensing module into an optical signal and radiate the optical signal into the air;

the optical communication receiving and demodulation module is configured to acquire the optical signal radiated into the air, perform optoelectronic conversion and demodulation on the acquired optical signal, and send demodulated data to the data processing module; and the data processing module is configured to use a weighted least square method to fuse each type of sensing data to obtain a first fusion parameter corresponding to each type of sensing data;

and use a fuzzy comprehensive evaluation method to analyze the first fusion parameter to obtain a monitoring result;

wherein the vibration energy harvesting module adopts a vertical contact-separation mode triboelectric nanogenerator (TENG) to harvest the vibration energy;

wherein the vibration energy harvesting module comprises the TENG and an electric energy management unit (3), the electric energy management unit (3) comprises a rectifier bridge and a filter circuit, an output terminal of the TENG is connected to the rectifier bridge, the rectifier bridge is connected to the filter circuit, and charges are input to the filter circuit for rectification.

2. The multi-sensor data fusion-based self-powered online monitoring system for a transmission line according to claim 1, wherein the filter circuit comprises a charge storage circuit, a threshold switch circuit, and a semioscillation circuit that are connected in sequence; and the charge storage circuit is connected to the rectifier bridge.

3. The multi-sensor data fusion-based self-powered online monitoring system for a transmission line according to claim 1, wherein the TENG comprises at least one second triboelectric generation module (4), the second triboelectric generation module (4) comprises a first electrode portion (41) and a second electrode portion (42) that match each other, the first electrode portion (41) comprises a dielectric film layer and an electrode layer, the second electrode portion (42) is a spring resonance structure, and the electrode layer of the first electrode portion (41) and the second electrode portion (42) serve as output terminals of the second triboelectric generation module (4).

4. The multi-sensor data fusion-based self-powered online monitoring system for a transmission line according to claim 3, wherein a side of the first electrode portion (41) close to the second electrode portion (42) is arc-shaped.

5. The multi-sensor data fusion-based self-powered online monitoring system for a transmission line according to claim 4, wherein the first electrode portion (41) comprises a support frame layer, and a side of the support frame layer close to the second electrode portion (42) is arc-shaped; and the electrode layer and the dielectric film layer are sequentially disposed on the side of the support frame layer close to the second electrode portion (42).

6. The multi-sensor data fusion-based self-powered online monitoring system for a transmission line according to claim 5, wherein the TENG comprises N pairs of second triboelectric generation modules (4), wherein N is a positive integer; each pair of second triboelectric generation modules (4) share one second electrode portion (42); and the triboelectric generation modules (4) are stacked.

7. The multi-sensor data fusion-based self-powered online monitoring system for a transmission line according to claim 6, wherein the TENG comprises a first support frame layer (41a), first electrode layer (41b), first dielectric film layer (41c), first spring steel sheet (42a), second dielectric film layer (41d), second electrode layer (41e), second support frame layer (41f), third electrode layer (41g), third dielectric film layer (41h), second spring steel sheet (42b), fourth dielectric film layer (41i), fourth electrode layer (41j), and third support frame layer (41k) that are designed layer by layer; the first support frame layer (41a), first electrode layer (41b), first dielectric film layer (41c), and first spring steel sheet (42a) form one second triboelectric generation module (4); the first spring steel sheet (42a), second dielectric film layer (41d), second electrode layer (41e), and second support frame layer (41f) form one second triboelectric generation module (4); the second support frame layer (41f), third electrode layer (41g), third dielectric film layer (41h), and second spring steel sheet (42b) form one second triboelectric generation module (4); the second spring steel sheet (42b), fourth dielectric film layer (41i), fourth electrode layer (41j), and third support frame layer (41k) form one second triboelectric generation module (4); and the second electrode layer (41e) and third electrode layer (41g) are connected to each other.

8. The multi-sensor data fusion-based self-powered online monitoring system for a transmission line according to claim 7, wherein an arc equation of the side of the first electrode portion (41) close to the second electrode portion (42) is an arc when the second electrode portion (42) vibrates and is curved.

9. The multi-sensor data fusion-based self-powered online monitoring system for a transmission line according to claim 4, wherein an arc equation of the side of the first electrode portion (41) close to the second electrode portion (42) is an arc when the second electrode portion (42) vibrates and is curved.

10. The multi-sensor data fusion-based self-powered online monitoring system for a transmission line according to claim 5, wherein an arc equation of the side of the first electrode portion (41) close to the second electrode portion (42) is an arc when the second electrode portion (42) vibrates and is curved.

11. The multi-sensor data fusion-based self-powered online monitoring system for a transmission line according to claim 6, wherein an arc equation of the side of the first electrode portion (41) close to the second electrode portion (42) is an arc when the second electrode portion (42) vibrates and is curved.

\* \* \* \* \*